A. MACKIE.
CORK CUTTING MACHINE.
No. 52,000. Patented Jan. 9, 1866.
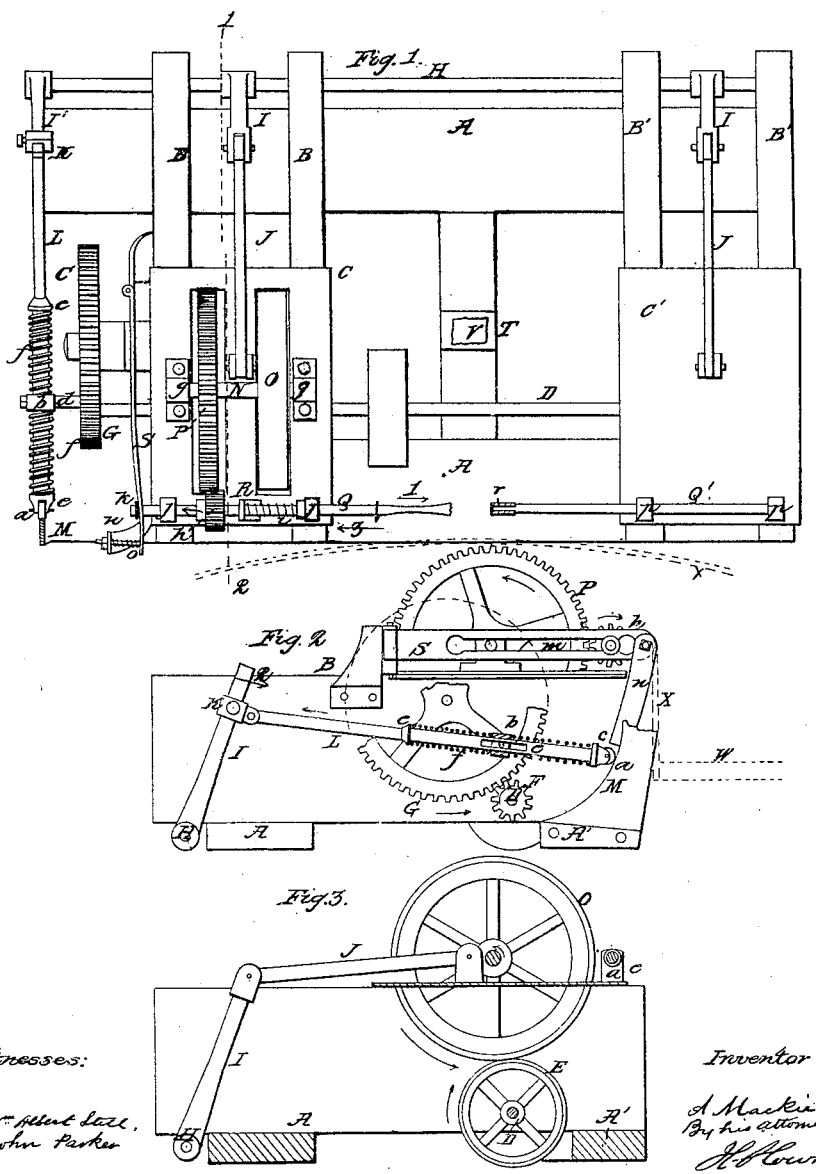

UNITED STATES PATENT OFFICE.

ALEXANDER MACKIE, OF PHILADELPHIA, PENNSYLVANIA, ASSIGNOR TO BORIE & MACKIE, OF SAME PLACE.

IMPROVEMENT IN CORK-CUTTING MACHINES.

Specification forming part of Letters Patent No. 52,000, dated January 9, 1866.

*To all whom it may concern:*

Be it known that I, ALEXANDER MACKIE, of Philadelphia, Pennsylvania, have invented an Improved Feeding Device for Cork-Cutting Machines; and I do hereby declare the following to be a full, clear, and exact description of the same, reference being had to the accompanying drawings, and to the letters of reference marked thereon.

My invention relates to certain improvements in a feeding device for a cork-cutting machine in which a rotating knife is used, such as is in the machine for which Letters Patent were granted to G. Lloyd, September 29, 1863; and my improvements consist in certain devices whereby the block of cork to be cut to a cylindrical form is seized, carried to the cutter-knife, revolved in contact with the same, and withdrawn, as fully described hereinafter.

In order to enable others skilled in the art to make and use my invention, I will now proceed to describe its construction and operation.

On reference to the accompanying drawings, which form a part of this specification, Figure 1 is a plan view of my improved feeding device for cork-cutting machines; Fig. 2, an end view, and Fig. 3 a section on the line 1 2, Fig. 1, looking in the direction of the arrow.

A is a portion of the frame of a cork-cutting machine, in the center of which revolves a horizontal disk, W, and to the edge of the latter is secured an annular knife, X.

To the frame A, near one side of the knife X, are secured parallel guides B B and B' B', a plate, C, sliding freely on the guides B B, and a plate, C', sliding freely on the guides B' B'.

To a driving-shaft, D, between the guides B B, is secured a friction-pulley, E, the periphery of which is covered with leather, and on the outer end of the shaft is a pinion, F, the teeth of which engage with those of a cog-wheel, G, hung to a bracket at the side of the outer guide, B.

Beneath the rear ends of the guides B B' vibrates a rock-shaft, H, to which are secured arms I I, and to the upper end of the latter are jointed connecting-rods J, the opposite end of each of which is jointed to a lug on one of the plates C C'.

To the outer end of the shaft H is secured an arm, I', on which is an adjustable block, K, and to the latter is jointed one end of a rod, L, in the opposite end of which is a friction-pulley, a, this end sometimes bearing against the edge of a cam-plate, M, secured to the frame A.

On the rod L, between two lugs, e e, slides a block, b, through which, and through a slot, c, in the rod, passes a pin, d, projecting from the side of the wheel G, and round the rod at each side of the block b, between the latter and one of the lugs, e, is coiled a spring, f.

In bearings g g on the plate C turns a shaft, N, on which is a leather-covered pulley, O, and a cog-wheel, P, and at the front edge of the plate C are bearings j j', in which turns a spindle, Q, a pinion, h, on the latter engaging with the teeth of the wheel P. A spring, i, is coiled round the spindle Q, and bears against a bracket, R, and against a collar on the spindle, and tends to force the latter in the direction of the arrow 1, Fig. 1. On the outer end of the spindle is a collar or button, k, this end of the spindle passing through a slot, m, in a curved plate, S, which is hinged at one end to a bracket secured to the outer guide, B. The central portion of the slot m is of such a size as to allow for the ready passage through it of the spindle, while at the ends it is so enlarged as to admit the button k.

Between the inner end of the plate S and a bracket, n, secured to the outer guide, B, is a spring, o, which tends to press this end of the plate toward the guide B.

In bearings p p' on the plate C' turns a spindle, Q', on the inner end of which a collar, r, turns freely.

To the frame A is secured an upright, T, for a purpose described hereinafter.

A rotary motion in the direction of its arrow is imparted to the driving-shaft D, Fig. 2.

A cubical block, V, of cork, which is to be cut to a cylindrical form, is placed on the upright T, and a rapid-revolving motion is imparted to the disk W and its knife, when the operation of the machine will be as follows: As the shaft D revolves the wheel G will be caused to revolve more slowly in the direction of its arrow, Fig. 2, a motion in the direction of the arrow 2 being thus imparted to the arm I′, the shaft H, and arms I I, so that the plates C C′ are carried on the guides toward the knife X. As the plates C C′, after reaching the limit of their forward motion, are moved back the button $k$ on the end of the spindle Q bears against the outer side of the curved plate S, the spindles being thus moved longitudinally in the direction of its arrow. As the plates are brought to the limit of their backward motion the spindle Q is brought into the enlarged end of the slot $m$, when the button $k$ passes through the latter as the spring $i$ carries the spindle in the direction of its arrow 1, so that its inner end is brought against the block V of cork, which is thus confined between the two spindles Q and Q′. As the wheel G continues to revolve the plates C C′, with the block of cork, are carried forward toward the knife X, on approaching which the periphery of the pulley O is brought against that of the revolving pulley E, the pulley O, its shaft and the wheel P, being thus caused to revolve and impart a rapid rotary motion to the spindle Q and the block of cork against which it bears, the latter, as it is brought against the revolving knife X, being cut to the cylindrical form required. As the plates C C′ are moved forward the button $k$ on the spindle Q bears on the inner side of the plate S, and gradually forces the latter out until the spindle reaches the limit of its forward movement, when the button $k$ will be brought opposite the enlarged end of the slot $m$, and the plate S will pass over the button to the position shown in Fig. 1. As the plates C C′ move back the spindle Q is again moved longitudinally in the direction of its arrow 3, so as to be no longer in contact with the block of cork, which drops into any suitable receptacle, and another is seized between the ends of the spindles, as before.

As the amount of cork cut away depends upon the extent to which it approaches the knife, it will be seen that the size of the cylindrical cork is regulated by the shape of the cam-plate M, the forward motion of the rod L, and consequently that of the plates C C′, being arrested when the end of the rod strikes the edge of the cam-plate. It will, however, be seen that this does not arrest the motion of the wheel G, as the pin $d$ has a limited motion in the slot $c$, the pin being returned to its original position in the slot by the springs $f$ when the end of the rod passes from contact with the cam-plate.

It will be apparent that the cam-plate may be so formed as to regulate the speed with which the cork is brought in contact with the knife without any alteration in the speed of the driving-shaft, and that by this means, also, the cork may be quickly withdrawn from the knife after being cut.

I claim as my invention and desire to secure by Letters Patent—

1. The sliding plates C C′, with the spindles Q Q′, combined with the within-described devices, or their equivalents, and with the revolving knife X, so that a block of cork will be seized between the two spindles, carried to the knife X, revolved while in contact with the same, and afterward withdrawn, all substantially as described.

2. The cam-plate M, combined with the sliding plates C C′, and the within-described devices, or their equivalents, for operating the said plates so that the movements of the latter may be regulated, substantially as and for the purpose specified.

3. The slotted rod L, with its springs $f f$, and sliding block $b$, combined with the wheel G and its pin $d$, so that the forward movement of the rod may be arrested without interfering with the movement of the wheel G, for the purpose specified.

In testimony whereof I have signed my name to this specification in the presence of two subscribing witnesses.

ALEXANDER MACKIE.

Witnesses:
CHARLES E. FOSTER,
JOHN WHITE.